Patented Apr. 13, 1954

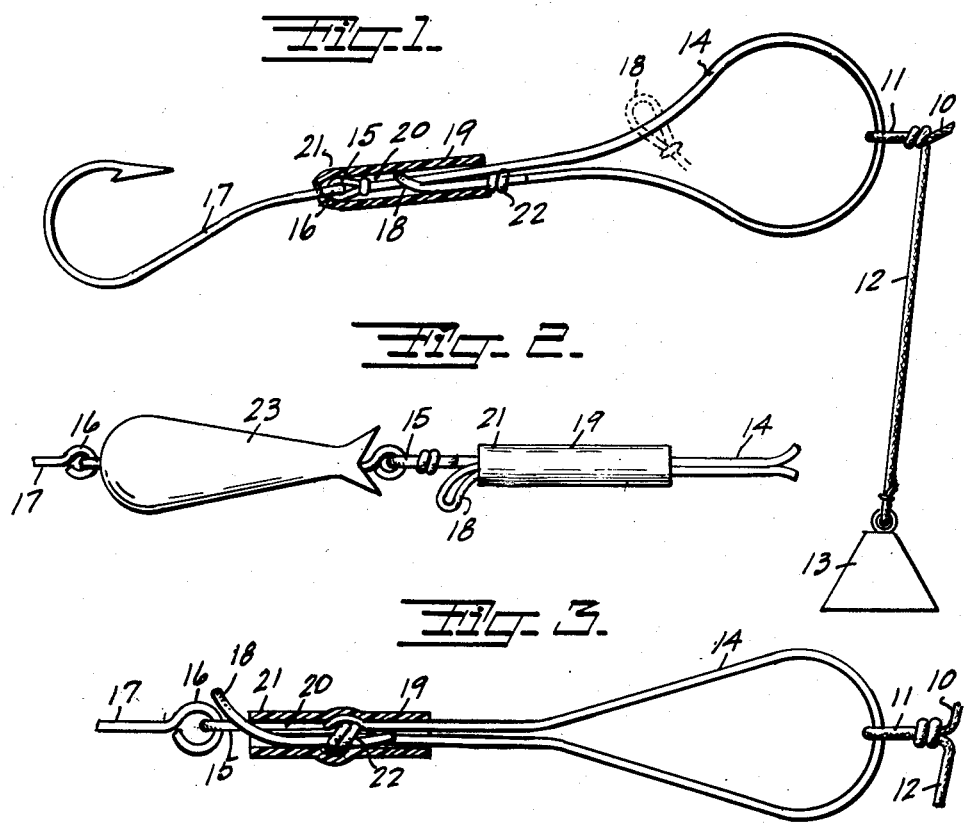

2,674,824

UNITED STATES PATENT OFFICE 2,674,824

SLIP NOOSE FISHING LEADER

Albert Werner, Walnut Creek, Calif.

Application November 5, 1952, Serial No. 318,858

6 Claims. (Cl. 43—44.83)

This invention relates to improvements in the methods of fishing and chiefly concerns the catching of nibblers which with conventional methods are seldom caught, and further concerns the effective hooking of striking fish, which often are not effectively hooked.

In the usual methods of fishing, particularly with casting lines, the hook is substantially loaded by the sinker, so that a nibbler never has a chance to make a run with the hook and therefore continues to nibble away at the bait until the bait is totally consumed or the fish abandons the bait because of its relative fixation, and a striking fish is caught up short when making a run with the bait, while with this invention the hook is apparently substantially free and a nibbler discovering apparent freedom of the bait will make a run and thereby hook itself, while a striking fish will be able to make a substantial run before being caught up by the sinker and thus be more effectively hooked.

As is well known, when a fish nibbles at the bait, it takes the entire hook or bait into its mouth, but with any appreciable resistance it releases the bait, and may try again, but if the hook is apparently free, it will attempt to get away with the bait, and thus be hooked when reaching the limit of free movement. For the above reasons, the catch with this invention is greatly increased over the conventional methods of fishing with fixed tackle.

The objects and advantages of the invention are as follows:

First, to provide a leader for a fishing line with a slip noose, in which the leader is doubled to provide half its length and so held under slight resistance and which leader is lengthened to substantially full length through ordinary pull by a fish while nibbling.

Second, to provide a leader as outlined which eliminates the pull of the sinker while a fish is nibbling to cause the fish to believe the bait to be free and to cause the fish to dash with the bait and thus become hooked.

Third, to provide a leader with a slip noose in conjunction with a relatively resilient and flexible sleeve which is threaded onto the leader with the slip noose insertible into the sleeve for halving its length and releasable for extension to full length under moderate pull by a fish.

Fourth, to provide means for retaining a leader in a doubled position and extendable to full length through nibbling pull by a fish.

In describing the invention reference will be had to the accompanying drawings, in which:

Fig. 1 is a side elevation of the invention with the friction sleeve shown in section.

Fig. 2 illustrates the method of connection when a lure is used.

Fig. 3 shows a modification of the invention in which friction is applied throughout extension of the leader from contracted to full length.

The invention consists of a line 10 having a loop 11 formed therein and with a sinker extension 12 extending therefrom and to the end of which a sinker 13 is fixed, and also includes a leader 14 one end 15 of which is fixed to the eye 16 of a fish hook 17, and having a slip noose 18 formed at the other end, and a sleeve 19 which is formed of a resilient and flexible material such as rubber though preferably of a resilient plastic such as the vinyl type of plastics which offers less friction than rubber and is also not too resilient. The hook 17 is successively threaded through the loop 11, the noose 18, and the sleeve 19. The sleeve has a bore 20 of such size as to frictionally hold the noose 18 when inserted as shown in Fig. 1, the first end 21 of the sleeve being forced over the eye of the hook, under which conditions the noose is merely pushed into the sleeve as shown in Fig. 1 before casting.

When a fish nibbles on the hook, it gives slight pulls which are just sufficient to cause the noose to be gradually pulled out of the sleeve after which the leader is free to extend to full length, and this freeing of the leader causes the fish to dash away with the bait thus causing the noose to slip up to the loop 11 where the weight of the sinker becomes effective to cause a sudden stop of the hook which causes the hooking of the fish. Thus the leader is retained at half length until nibbled or struck by a fish, and thereafter becomes freed to be extended to full length.

Fig. 3 is identical to Fig. 1 with the exception that instead of the one end 21 of the sleeve being fixed over the eye 16 of the hook 17 and the noose merely inserted into the other end, the sleeve is positioned free of the eye and the noose is pulled through the sleeve to position the knot 22 of the noose 18 inside the sleeve, the sleeve being in sliding engagement with the first end portion of the leader and the knot 22 thus maintaining the leader under continuous slight friction up to where the sleeve reaches the loop 11. In other words, there is no difference in construction between Figs. 1 and 3, but merely in the placing of the sleeve.

Thus the invention is adjustable at will to suit the specific fishing conditions. As adjusted in Fig. 1, the noose is slipped into the sleeve and a pull on the hook frees the noose to slide freely on the leader to full length. As illustrated in Figs. 2 and 3, the sleeve is pulled back off the eye, and the terminal end of the noose is pulled through to draw the knot inside the sleeve, thus providing a friction element to allow the sleeve and noose to slide along the leader only through each application of pull on the hook.

This invention eliminates the necessity for any sinker release, thus saving the cost of sinkers which are lost usually with each strike of a fish, and which does not assist in the hooking of a nibbler.

As illustrated in Fig. 2, if a lure 23 is used, it is placed between the hook and the leader.

I claim:

1. Fishing tackle comprising a fish line having a sinker attached at one end and a loop formed in spaced relation to the sinker, a leader having one end attached to a fish hook and having a noose formed at the other end, and a sleeve, said fish hook being threaded successively through said loop, said noose, and said sleeve, said sleeve providing a friction element for retaining said leader in doubled position, said leader being extended to substantially full length through a pull on the fish hook.

2. A structure as defined in claim 1; said sleeve being adjustable at will to suit fishing conditions, to positions respectively with one end frictionally secured over the eye of the hook and with the noose inserted into the other end of the sleeve for complete freeing of the noose by a pull on the hook, and with the noose having a knot positioned within the sleeve to provide a friction element for a strand of the leader.

3. A leader for a fish line, the fish line having a loop formed therein in spaced relation to the terminal end thereof, said leader having one end attachable to a hook or the like and having a noose formed on the other end, said one end being threaded through said loop and said noose, and a resilient sleeve threaded onto said one end having an inside diameter of such size as to frictionally receive said noose.

4. A structure as defined in claim 3, said noose including a knot to be positioned within said sleeve for frictionally holding said sleeve in position on said leader for movement thereon only through a pull by a fish on said one end.

5. A structure as defined in claim 4; said sleeve having an inside diameter of such size as to permit frictional engagement over the eye of a fish hook for selective operation in conformity with the specific fishing conditions.

6. A leader having one end attachable to a fish hook or the like and having a noose formed at the other end, and a sleeve slidable on said leader having an inside diameter of such size as to frictionally receive the noose therein for release by a predetermined pull on the said one end.

References Cited in the file of this patent
UNITED STATES PATENTS

| Number | Name | Date |
| --- | --- | --- |
| 676,962 | Payton | June 25, 1901 |
| 1,438,476 | Bley | Dec. 12, 1922 |
| 2,569,312 | Holm | Sept. 25, 1951 |